US006640425B1

(12) United States Patent
Suzuki

(10) Patent No.: US 6,640,425 B1
(45) Date of Patent: Nov. 4, 2003

(54) APPARATUS FOR PRODUCING WIRE HARNESSES FOR AUTOMOTIVE VEHICLES

(75) Inventor: Toshiaki Suzuki, Nagoya (JP)

(73) Assignees: Sumitomo Wiring Systems, Ltd. (JP); Harness System Technologies Research, Ltd. (JP); Sumitomo Electric Industries, Ltd. (JP)

( * ) Notice: Subject to any disclaimer, the term of this patent is extended or adjusted under 35 U.S.C. 154(b) by 181 days.

(21) Appl. No.: 09/654,551

(22) Filed: Sep. 1, 2000

Related U.S. Application Data

(62) Division of application No. 08/861,976, filed on May 22, 1997, now Pat. No. 6,163,958.

(30) Foreign Application Priority Data

May 29, 1996 (JP) ............................................ 8-135351

(51) Int. Cl.[7] .......................... B23P 19/00; H01R 43/00

(52) U.S. Cl. .......................... 29/749; 29/33 M; 29/866; 29/825; 29/865; 29/861; 29/857

(58) Field of Search ................................ 29/749, 33 M, 29/865, 866, 867, 861, 825, 564.4, 857

(56) References Cited

U.S. PATENT DOCUMENTS 4,638,549 A * 1/1987 Okazaki et al. ............ 29/564.4
4,646,404 A * 3/1987 Matsui ...................... 29/33 M
5,450,777 A * 9/1995 Molnar et al. ................. 83/98

* cited by examiner

*Primary Examiner*—Richard Chang
(74) *Attorney, Agent, or Firm*—Muserlian, Lucas and Mercanti

(57) ABSTRACT

An apparatus for producing wire harnesses for automotive vehicles is disclosed. The apparatus includes a gripper (10) including a wire feeder (15) for holding a plurality of insulator-sheathed electric wire elements (a) juxtaposed on a plane, a cutter (20), an insulation displacement press device (30), with a wire-drawing device (38) provided on the rear side thereof, and a measuring and drawing device (40).

1 Claim, 11 Drawing Sheets

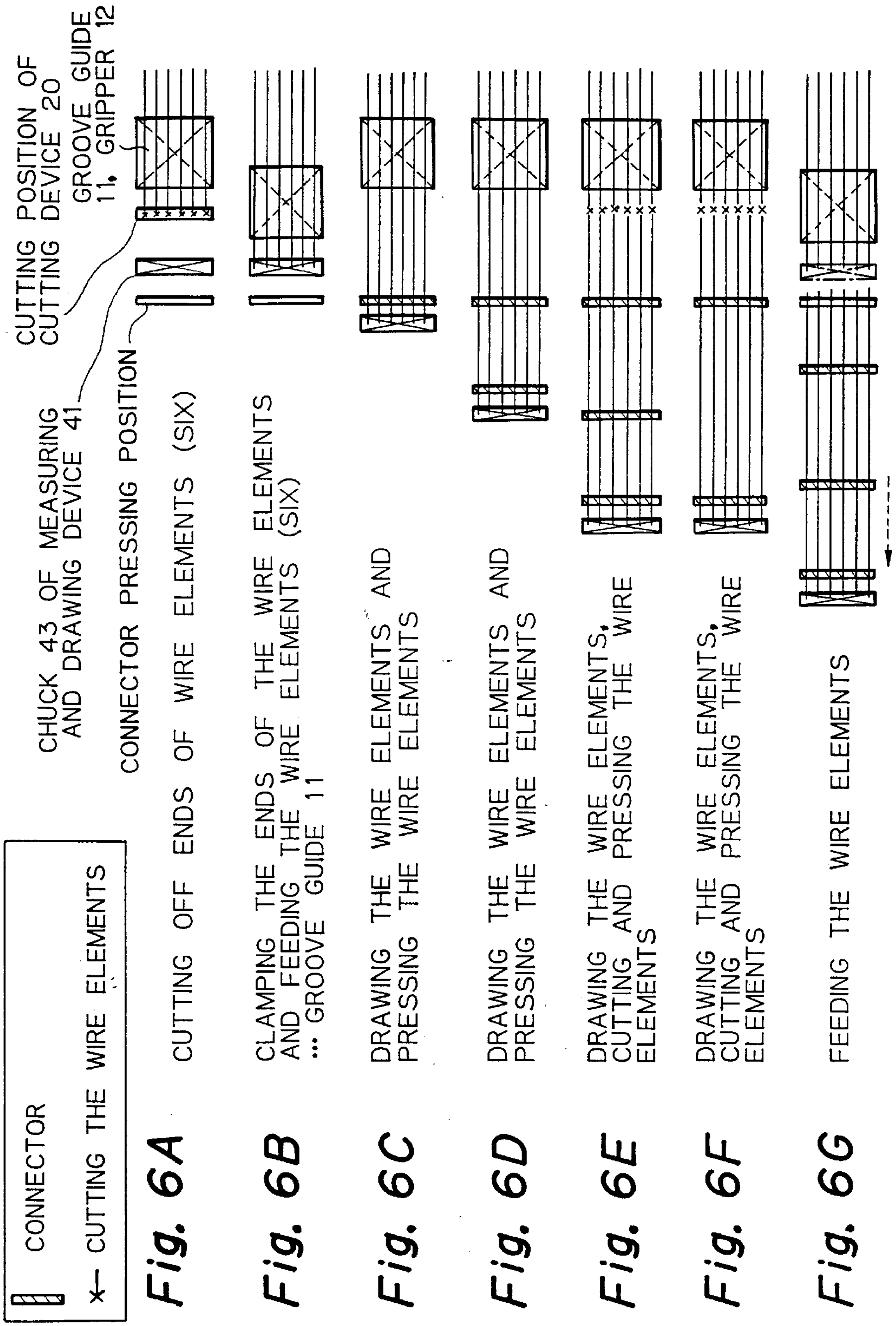
CONNECTOR
CUTTING THE WIRE ELEMENTS
CHUCK 43 OF MEASURING AND DRAWING DEVICE 41
CONNECTOR PRESSING POSITION
CUTTING POSITION OF CUTTING DEVICE 20
GROOVE GUIDE 11, GRIPPER 12
Fig. 6A
CUTTING OFF ENDS OF WIRE ELEMENTS (SIX)
Fig. 6B
CLAMPING THE ENDS OF THE WIRE ELEMENTS AND FEEDING THE WIRE ELEMENTS (SIX) ... GROOVE GUIDE 11
Fig. 6C
DRAWING THE WIRE ELEMENTS AND PRESSING THE WIRE ELEMENTS
Fig. 6D
DRAWING THE WIRE ELEMENTS AND PRESSING THE WIRE ELEMENTS
Fig. 6E
DRAWING THE WIRE ELEMENTS, CUTTING AND PRESSING THE WIRE ELEMENTS
Fig. 6F
DRAWING THE WIRE ELEMENTS, CUTTING AND PRESSING THE WIRE ELEMENTS
Fig. 6G
FEEDING THE WIRE ELEMENTS

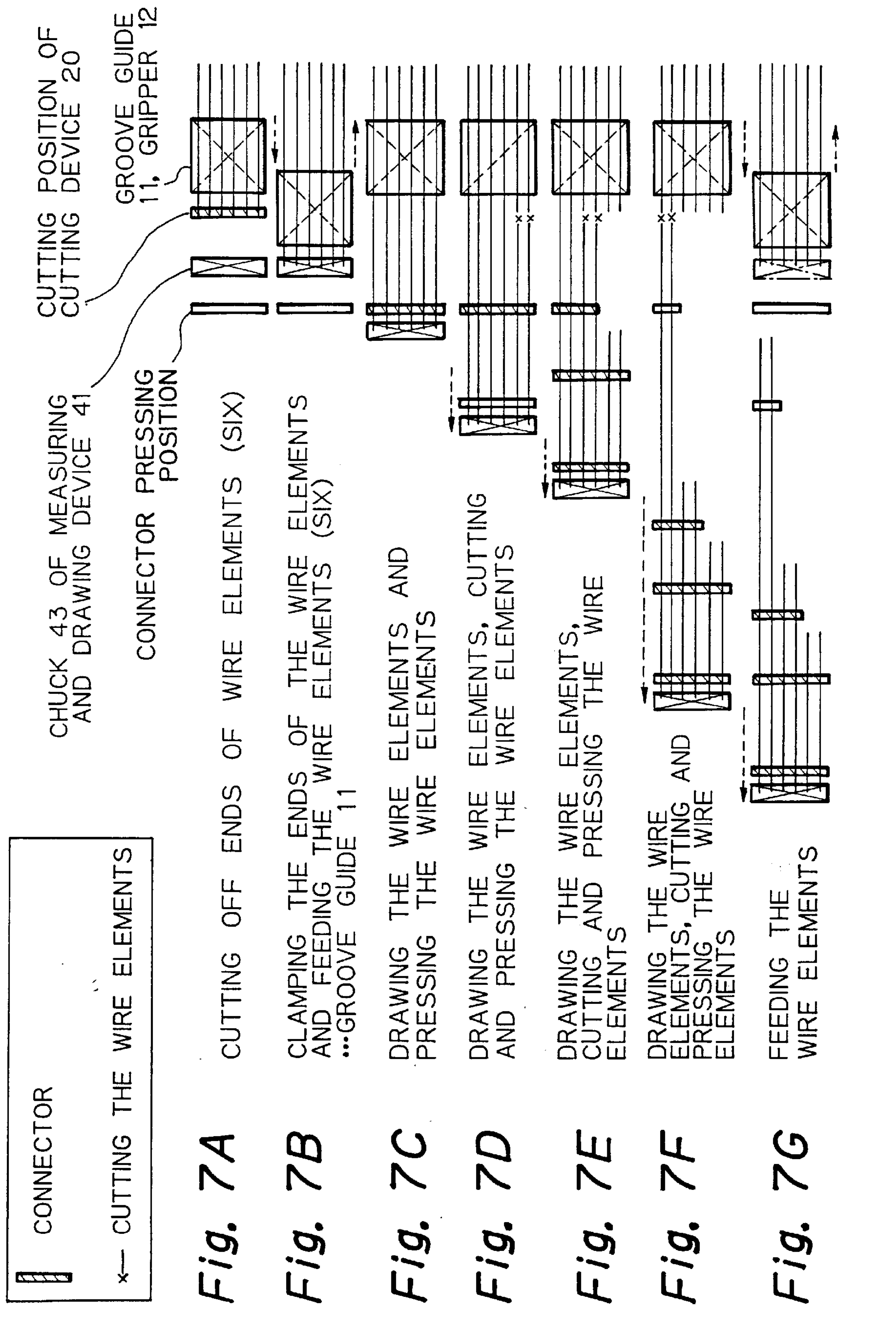
CONNECTOR
CUTTING THE WIRE ELEMENTS
CHUCK 43 OF MEASURING AND DRAWING DEVICE 41
CONNECTOR PRESSING POSITION
CUTTING POSITION OF CUTTING DEVICE 20
GROOVE GUIDE 11, GRIPPER 12
CUTTING OFF ENDS OF WIRE ELEMENTS (SIX)
CLAMPING THE ENDS OF THE WIRE ELEMENTS AND FEEDING THE WIRE ELEMENTS (SIX) ••GROOVE GUIDE 11
DRAWING THE WIRE ELEMENTS AND PRESSING THE WIRE ELEMENTS
DRAWING THE WIRE ELEMENTS, CUTTING AND PRESSING THE WIRE ELEMENTS
DRAWING THE WIRE ELEMENTS, CUTTING AND PRESSING THE WIRE ELEMENTS
DRAWING THE WIRE ELEMENTS, CUTTING AND PRESSING THE WIRE ELEMENTS
FEEDING THE WIRE ELEMENTS
Fig. 7A
Fig. 7B
Fig. 7C
Fig. 7D
Fig. 7E
Fig. 7F
Fig. 7G

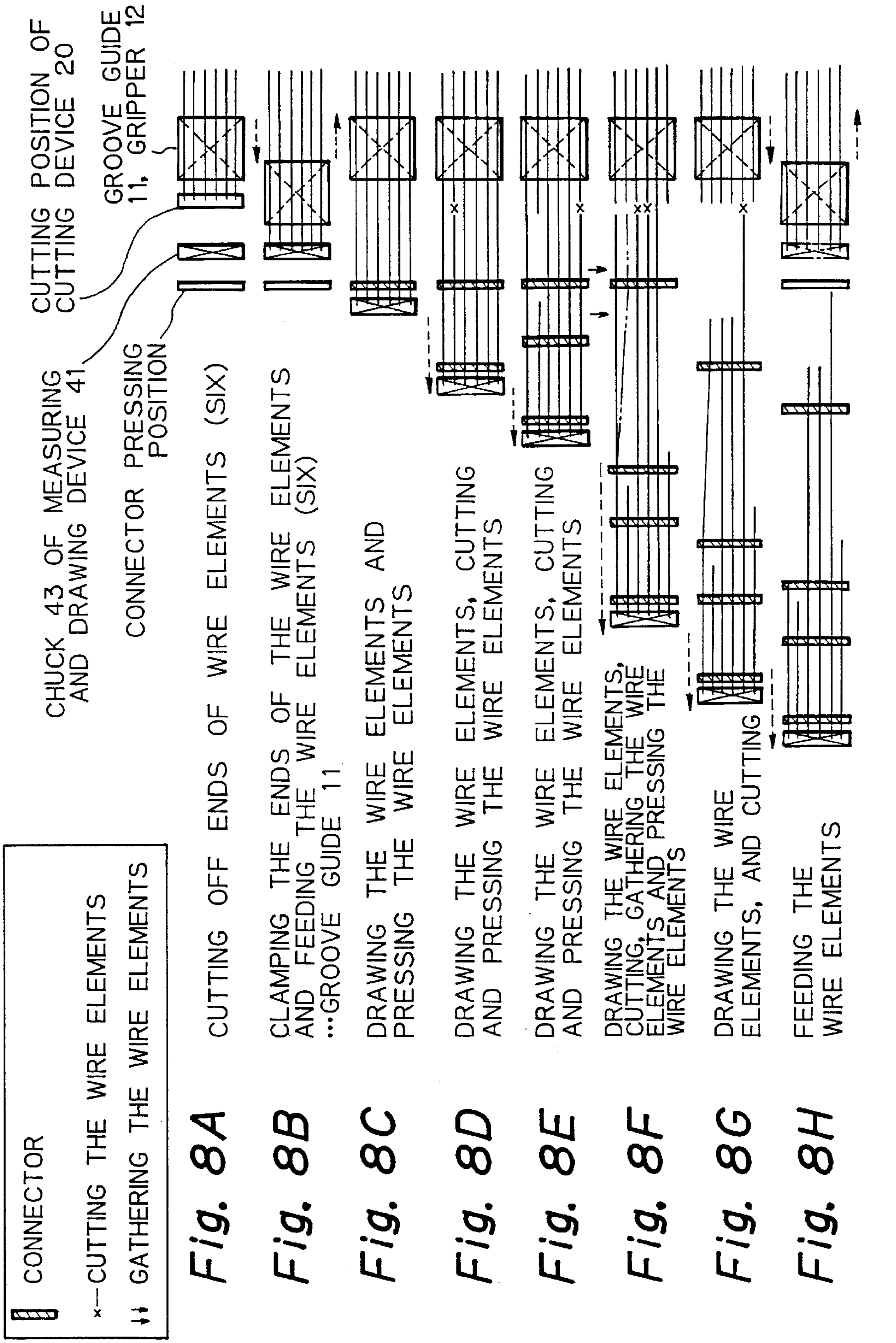
CONNECTOR
×—CUTTING THE WIRE ELEMENTS
GATHERING THE WIRE ELEMENTS
CHUCK 43 OF MEASURING AND DRAWING DEVICE 41
CUTTING POSITION OF CUTTING DEVICE 20
GROOVE GUIDE 11, GRIPPER 12
CONNECTOR PRESSING POSITION
Fig. 8A CUTTING OFF ENDS OF WIRE ELEMENTS (SIX)
Fig. 8B CLAMPING THE ENDS OF THE WIRE ELEMENTS AND FEEDING THE WIRE ELEMENTS (SIX) ···GROOVE GUIDE 11
Fig. 8C DRAWING THE WIRE ELEMENTS AND PRESSING THE WIRE ELEMENTS
Fig. 8D DRAWING THE WIRE ELEMENTS, CUTTING AND PRESSING THE WIRE ELEMENTS
Fig. 8E DRAWING THE WIRE ELEMENTS, CUTTING AND PRESSING THE WIRE ELEMENTS
Fig. 8F DRAWING THE WIRE ELEMENTS, CUTTING, GATHERING THE WIRE ELEMENTS AND PRESSING THE WIRE ELEMENTS
Fig. 8G DRAWING THE WIRE ELEMENTS, AND CUTTING
Fig. 8H FEEDING THE WIRE ELEMENTS

APPARATUS FOR PRODUCING WIRE HARNESSES FOR AUTOMOTIVE VEHICLES

This is a Divisional Application of U.S. patent application, Ser. No. 08/861,976, filed May 22, 1997.

BACKGROUND OF THE INVENTION

This invention relates to a wire harness for an automotive vehicle, in which a plurality of insulator-sheathed electric wire elements are juxtaposed on a plane and are provided at suitable positions with connectors, and relates to a method and an apparatus for producing the wire harness.

Electrical appliances in an automotive vehicle are electrically interconnected through wire harnesses. For convenience of explanation a typical example of the conventional wire harnesses is described below by referring to FIGS. 11 to 13B. FIG. 11 is an explanatory view of a conventional wire harness. FIG. 12 is a perspective view of a conventional plat electric wire. FIGS. 13A and 13B are explanatory views of a conventional method for branching the wire harness.

A typical conventional wire harness, as shown in FIG. 11, has a plurality of insulator-sheathed electric wire elements a and connectors c attached to the wire elements a. However, a work of inserting every wire element a into the connector individually is troublesome and raises a cost of the wire harness.

Consequently, a so-called flat electric wire P shown in FIG. 12 has been utilized. Since this wire P is made of a plurality of single core electric wire elements a juxtaposed integrally, the elements a are not separated from each other and thus the wire is easy to handle. Further, this wire is useful since insulator displacement terminals can be connected to the wire elements at a time (see FIGS. 13, 2A, and 2B).

However, the electric wire P, as shown in FIG. 12, has an integrated insulator sheath for each wire element a and thus is very expensive in comparison with the same number of single core insulator-sheathed electric wire elements a. It is desirable to produce the electric wire P (wire elements a) as inexpensively as possible since the wire harnesses are used in so many circuits.

In the event that the wire harness W is arranged, for example, from a joint box B to each electric appliance D, as shown in FIG. 11, the number of the wire elements a is decreased as they are away from the joint box B. When such wire harness W shown in FIG. 11 is formed by using the flat electric wire P shown in FIG. 12, insulation displacement terminals t shown in FIGS. 13A and 13B are usually utilized to connect each wire element a to the connector C. At this time, the wire element a' (FIG. 13A) which extends over a branch becomes useless. Although such useless wire element a' should be removed from the wire harness in view of a cost, the removement process of the insulator-integrally-sheathed electric wire P will raise a cost.

Also, positions of the insulation displacement terminals t at the respective branching portions are not adjacent to each other but at random, as shown in FIGS. 13A and 13B. The positions of connector terminals in the joint box are different from those of the terminals in the branching connector C on account of the respective electric appliances of different makers. Thus, it will be understood from the drawings that distances between the terminals t to be simultaneously brought into insulation displacement contact are different and an insulation displacement work for the terminals are complicated. If the distances between the terminals are constant, the work will be simplified. If the distances between the terminals are different, there may be necessary wire elements a between the wire elements a to be cut and thus this results in a difficult work of removing the useless wire element a'.

SUMMARY OF THE INVENTION

An object of the present invention is to lower a producing cost of a wire harness for an automotive vehicle.

Another object of the present invention is to provide a method for producing a wire harness for an automotive vehicle, in which a cost can be lowered.

Still another object of the present invention is to provide an apparatus for producing a wire harness for an automotive vehicle, in which a cost can be lowered.

In order to achieve the above objects, a wire harness for an automotive vehicle in accordance with the present invention includes a plurality of insulator-sheathed electric wire elements juxtaposed on a plane, the given electric wire elements being secured together to a connector by an insulation displacement manner at the given their positions in the length and width directions.

Since the wire harness of the present invention is formed by together pressing the plural electric wire elements directly on the connector, the wire harness becomes simpler in construction and lower in cost than a conventional wire harness. It is possible to utilize an insulator-sheathed electric wire element having a minimum diameter, for example, 1 mm or less and also to use the elements with different diameters.

The insulator-sheathed electric wire elements are juxtaposed on a plane at the same pitch as that of terminals in the connector and in the event that the electric wire elements have different lengths and the electric wire elements to be secured to the connector are reduced the given electric wire elements are gathered in the width direction at the same pitch and then secured together to the connector by the insulation displacement manner.

It is possible to use a connector having terminals corresponding to the reduced wire elements, thereby making a connector compact and cheap.

A third connector is disposed between first and second connectors and given electric wire elements secured to the first, second and third connectors have a length longer than that of the other electric wire elements secured to the first and second connectors.

A connector on which a part of the electric wire elements is pressed does not project from the other electric wire circuit, thereby increasing a flexibility of connection to each electric appliance.

A method for producing a wire harness for an automotive vehicle in accordance with the present invention comprises the steps of:

- juxtaposing a plurality of insulator-sheathed electric wire elements on a plane;
- passing the juxtaposed wire elements through a gripper and a cutter;
- clamping ends of the juxtaposed wire elements by a chuck of a measuring and drawing device;
- advancing the chuck until the juxtaposed wire elements are disposed in an insulation displacement press device;
- securing given wire elements of the juxtaposed wire elements to a connector in an insulation displacement manner by the press device;
- drawing the other juxtaposed wire element by a desired length from the press device by advancing the chuck;

securing given wire elements of the other juxtaposed wire elements to the connector in an insulation displacement manner by the press device;

attaching given wire elements of the juxtaposed wire elements to the connector at desired positions in length and width directions of the wires by repeating the above steps;

cutting off given wire elements of the juxtaposed wire elements behind the connector by the cutter in accordance with a working requirement; and cutting off opposite ends of all of the juxtaposed wire elements to form a wire harness.

The above third through fifth steps may be replaced by the steps of: disposing ends of the juxtaposed wire elements in an insulation displacement press device; securing the ends of given wire elements of the juxtaposed wire elements to a connector in an insulation displacement manner by the press device; and clamping the other ends of the juxtaposed wire elements by a chuck of a measuring and drawing device.

The wire elements after being cut may be gathered in the width direction to accord with a pitch between terminals juxtaposed in the connector. The wire elements are secured to the connector in an insulation displacement manner.

In the step of attaching the wire elements to the connector a group of wire out of the juxtaposed wire elements are drawn from the gripper by a length longer than that of the other wire elements and then the group of wire elements are secured to the connector in an insulation displacement manner.

An apparatus for producing a wire harness for an automotive vehicle in accordance with the present invention, comprises: a gripper, a cutter, an insulation displacement press device, and a measuring and drawing device which are arranged on straight line in order and through which a plurality of insulator-sheathed electric wire elements juxtaposed on a plane pass. The measuring and drawing device is adapted to clamp ends of the juxtaposed wire elements and draw the wire elements by a desired length by a chuck provided in the device. The insulation displacement press device is adapted to secure the wire elements to a connector in an insulation displacement manner. The cutter is adapted to cut off any wire element out of the juxtaposed wire elements. The gripper is adapted to clamp ends of the juxtaposed wire elements after all of the wire element are cut off and to displace the ends to the chuck of the measuring and drawing device.

A wire-gathering device may be provided on the rear side of the cutter, and wherein the wire-gathering device is adapted to gather the juxtaposed wire elements in the width direction to accord with a pitch between terminals juxtaposed in the connector.

A wire-drawing device maybe provided on the rear side of the insulation displacement press device. The wire-drawing device is adapted to clamp a group of the juxtaposed wire elements and to draw the group of wire elements by a desired length from the gripper.

BRIEF DESCRIPTION OF THE DRAWINGS

FIGS. 6A to 6G are explanatory views of processes of the embodiment of the producing method in accordance with the present invention;

FIGS. 7A to 7G are explanatory views of processes of another embodiment of the producing method in accordance with the present invention;

FIGS. 8A to 8G are explanatory views of processes of still another embodiment of the producing method in accordance with the present invention;

DETAILED DESCRIPTION OF THE PREFERRED EMBODIMENTS

Figure 1:
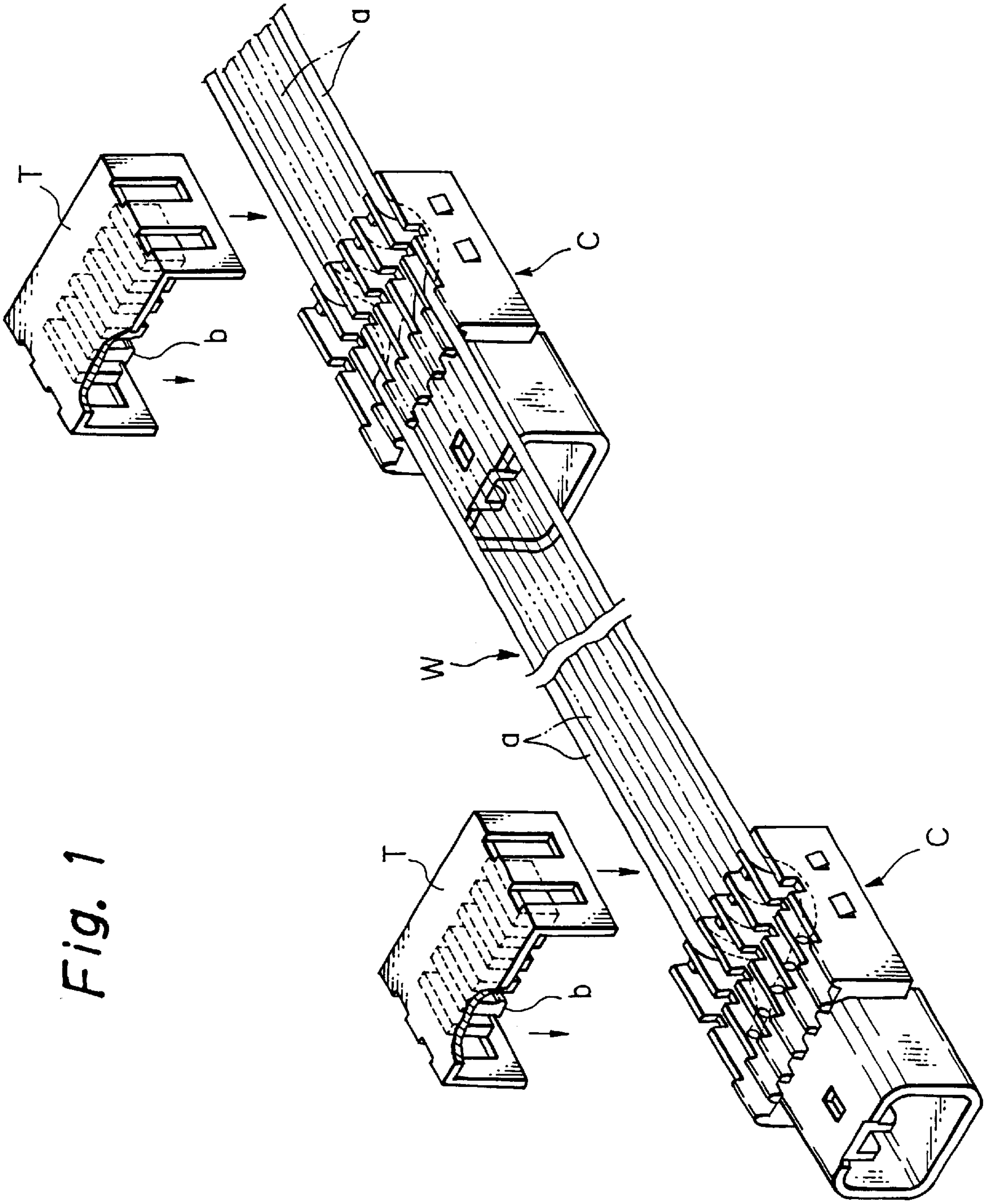
FIG. 1 is a schematic perspective view of an embodiment of a wire harness for an automotive vehicle in accordance with the present invention.
Figure 2A:
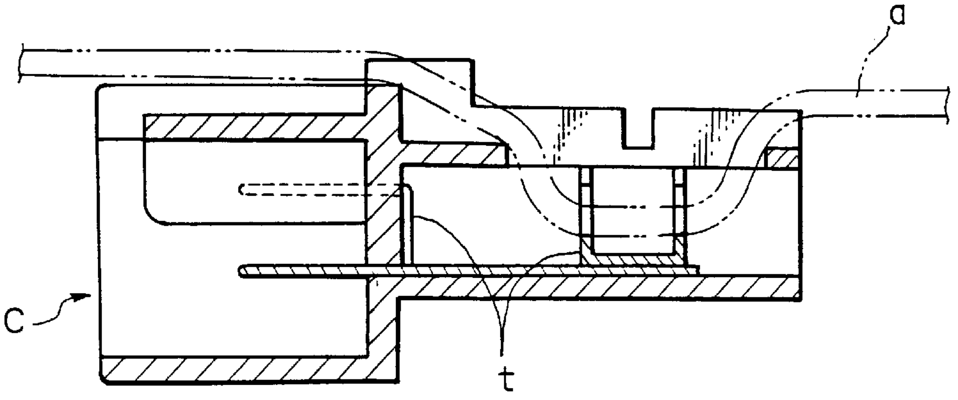
FIG. 2A is a longitudinal sectional view of a connector in the embodiment shown in FIG. 1.
Figure 2B:
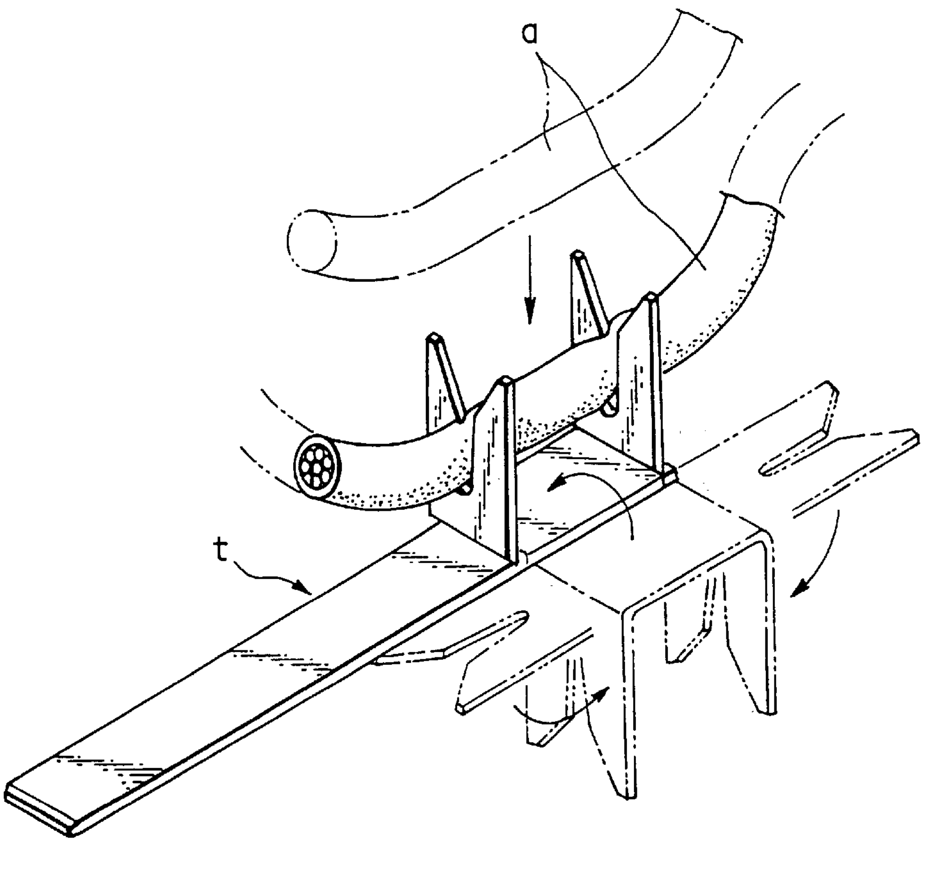
FIG. 2B is a perspective view of a terminal in the connector shown in FIG. 2A.

FIG. 1 and FIGS. 2A and 2B show an embodiment of a wire harness for an automotive vehicle in accordance with the present invention. The wire harness includes a plurality of insulator-sheathed electric wire elements a juxtaposed on a plane and connectors C which secures the wire elements a together in an insulation displacement manner at suitable longitudinal positions of the elements. The electric wire element a is made of twisted conductive strands and has an outer diameter of 1.8 mm.

The connector C includes a plurality of insulation displacement terminals t. As shown in FIG. 2B, the terminal t is formed by bending a metal sheet from a position shown by two-dot chain lines to a position shown by solid lines and is provided with two blades which are adapted to support the electric wire element a in an insulation displacement manner. Upon insulation displacement connection, the wire element a is pressed into a cavity in the connector C so that the wire element a is bent in a U-shape and is received between two blades of the terminal t in the insulation displacement manner, as shown in FIGS. 2A and 2B. A cover T is put onto the connector C so that each projection b on the inner surface of the cover T pushes down the wire element a, as shown in FIG. 1. Thus, the wire element a hardly comes out of the connector C.

Figure 3:
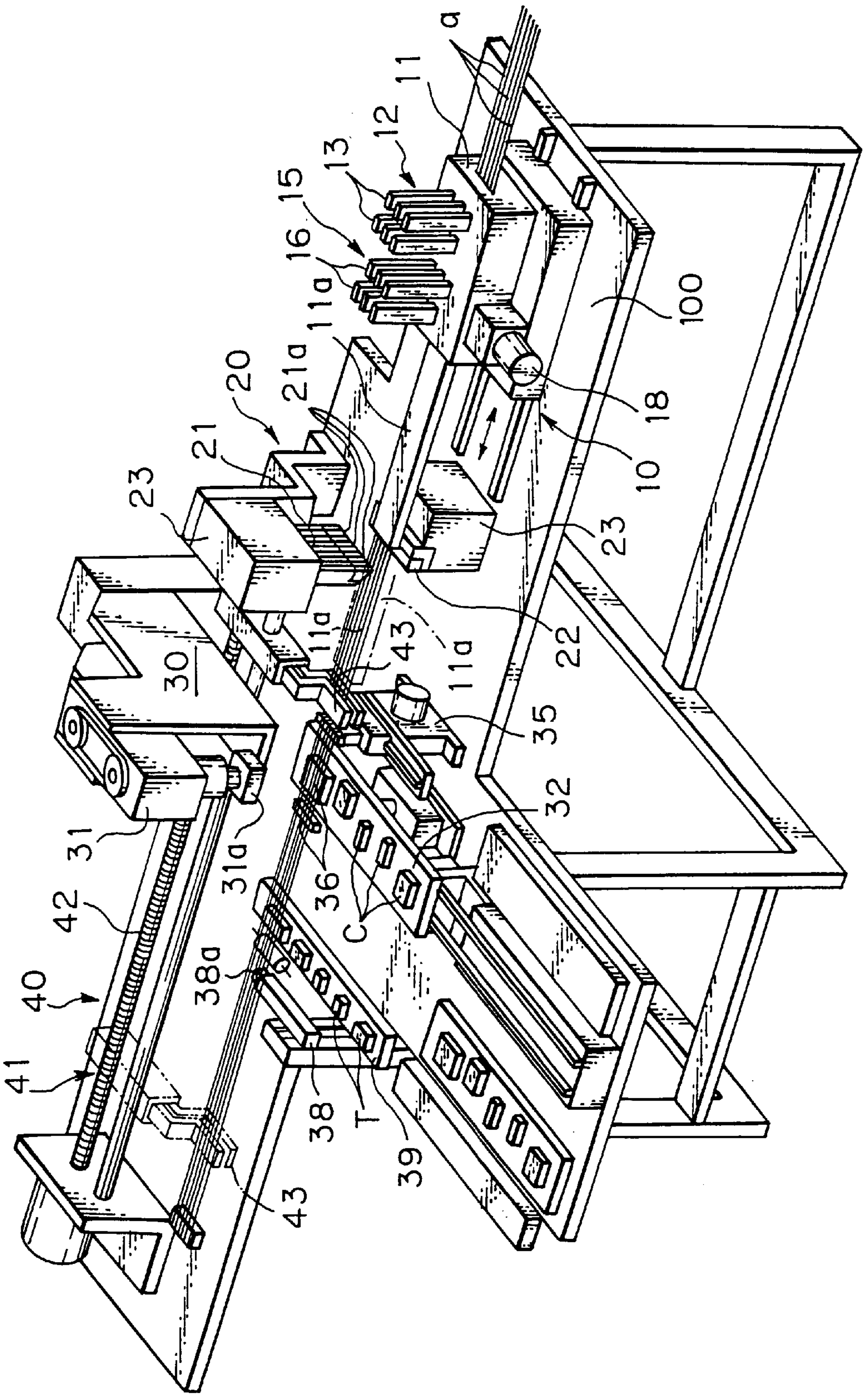
FIG. 3 is a schematic perspective view of an embodiment of an apparatus for producing a wire harness for an automotive vehicle in accordance with the present invention.
Figure 4:
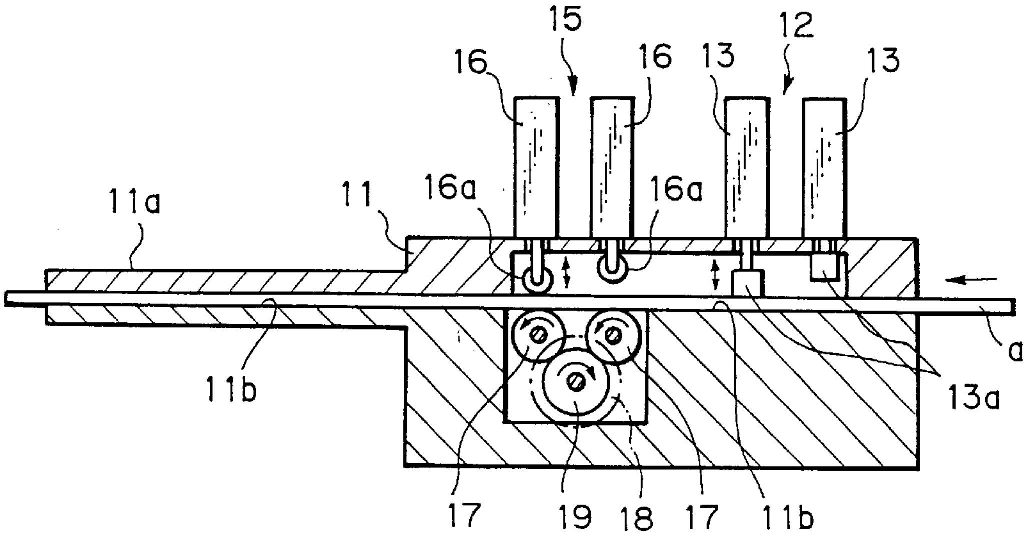
FIG. 4 is an enlarged longitudinal sectional view of a main part of the apparatus shown in FIG. 3.
Figure 5:
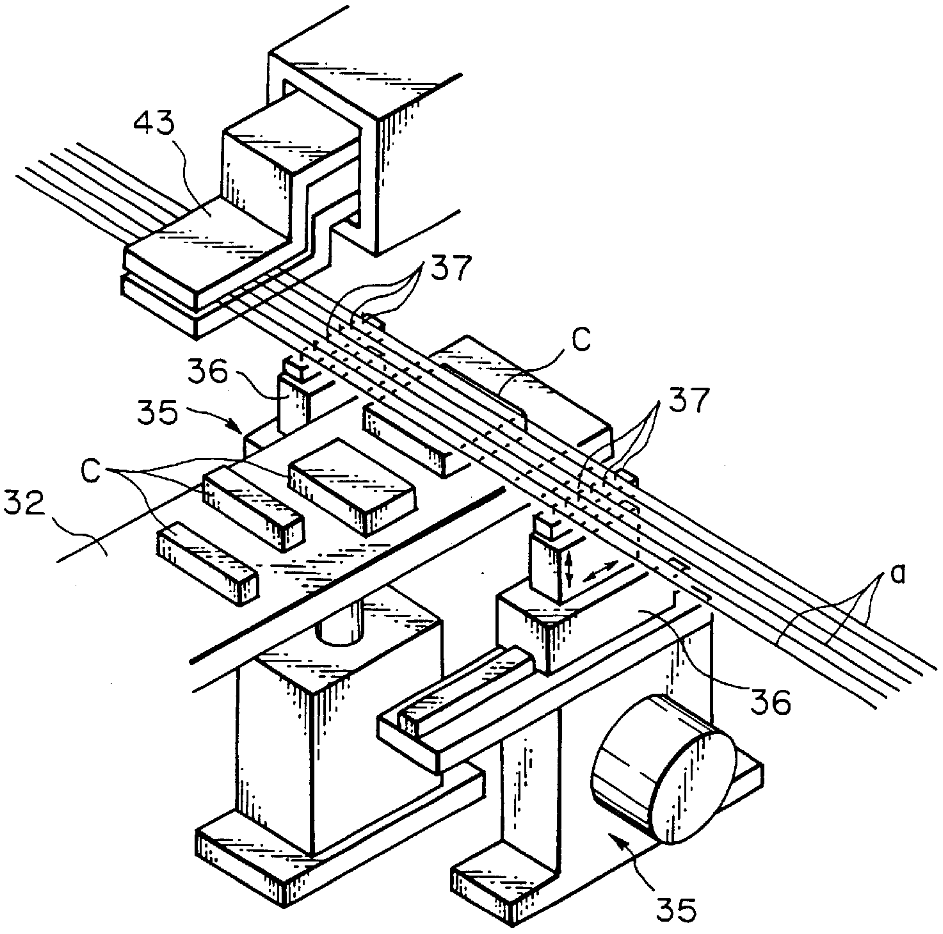
FIG. 5 is a perspective view of a connector insulation displacement station in the embodiment shown in FIG. 3.

FIGS. 3 through 5 show an embodiment of an apparatus for producing a wire harness W for an automotive vehicle in accordance with the present invention. The apparatus includes a clamping station 10 of the electric wire elements a, a cutting station 20 of the elements a, an attaching station 30 of the connector C, and a measuring and drawing station 40 of the elements a. These stations 10, 20, 30, and 40 are provided on a base table 100.

The clamping station 10 of the wire elements a, as shown in FIGS. 3 and 4, comprises a groove guide 11 which is provided on a front side with an arm 11*a*, a gripper 12 which is adapted to push down the wire elements a which pass the groove guide 11, and a feeder 15 of the wire elements a. The groove guide 11 has a pair of flat members. The groove guide is provided in the whole length with a plurality of grooves 11*b* in accordance with a pitch of the terminal t juxtaposed in the connector C. The insulator-sheathed electric wire elements a from plural wire supplies (not shown) are led into the respective grooves 11*b* while torsions in the wire elements a are being corrected. The groove guide 11 are moved forward and backward by a cylinder (not shown) so that the arm 11*a* can reach the cutting station 20 as shown by two-dot chain lines in FIG. 3.

As shown in FIGS. 3 and 4, the gripper 12 includes three front air cylinders 13 and three rear air cylinder 13 on the groove guides 11. When each air cylinder 13 is actuated, a pusher 13*a* on the distal end of the air cylinder 13 pushes down the wire element a in the groove 11*b*, thereby restraining the wire element a from moving in the groove 11*b* (see the front air cylinder 13 in FIG. 4). When the pusher 13*a* is elevated (see the rear air cylinder 13 in FIG. 4), the wire element cannot move easily in the groove 11*b* on account of a frictional resistance on the groove 11*b*, although the wire element a is free in the groove 11*b*. The front and rear air cylinders 13 are shifted from each other in a direction perpendicular to a wire feeding direction, since a diameter of the air cylinder 13 is larger than a distance (pitch) between the wire elements a and this makes it difficult to align the air cylinders (hereinafter, the same situation will be applied to feeding rollers 16*a* and cutting blades 21*a*.).

The wire feeder 15, as shown in FIGS. 3 and 4, includes three front air cylinders 16 and three rear air cylinders 16 on the groove guide 11, rotary rollers 17, and a drive motor 18 of the rollers 17. As shown in FIG. 4, the rotary rollers 17 are normally driven through idlers 19 by the motor 18, as shown in FIG. 4. When rollers 16*a* on the distal ends of the front air cylinders 16 are lowered to come into contact with the rollers 17 through the wire elements a, the wire elements a are fed by the rotation of the rollers 16*a* and 17. This feeding amount is accorded with a drawing amount of the measuring and drawing station 40 described hereinafter.

Thus, any one of the electric wire elements a can be selectively fed by selectively actuating the air cylinders 13 and 16 in the wire clamping station 10.

The wire cutting station 20, as shown in FIG. 3, includes an upper cutter 21, a lower cutter 22, and air cylinders 23 which serve to move up and down the cutters 21 and 22. The upper cutter 21 has blades 21*a* corresponding to the wire elements a. The air cylinders 23 are provided on the front and rear sides with three ones corresponding to the blades 21*a*, respectively. Each blade 21*a* can cut off each wire element a from the groove guide 11 individually by means of up and down movement of the blade. The rear air cylinder 23 moves the blade 21*a* through a link mechanism.

The connector attaching (pressing) station 30 includes an insulation displacement press device 31, a supply table 32 of the connector C, a wire gathering device 35, a wire drawing device 38, and a supply table 39 of the cover T. The insulation displacement press device 31 moves up and down a pusher 31*a* to connector the wire elements a to the terminals t in the connector C in the insulation displacement manner. In the embodiment shown in FIG. 3, the connector C is manually supplied to the pressing position, but it may be supplied thereto by an automatic machine. The pusher 31*a* can be automatically changed in accordance with a kind of the connector C.

As shown in FIG. 5, the wire gathering device 35 is disposed on the opposite sides of the connector supply table 32 and is provided with a movable member 36 which can move up and down, and right and left and which has gathering pins on the upper surface. The movable member 36 is moved up and down by an air cylinder (not shown). The movable member 36 is normally retracted below a passing path of the wire element a so as not to interfer the movement of the wire elements a. Upon gathering the wire elements a described below, the pin 37 moves up, right, and left to gather the wire elements a. That is, the wire gathering device 35 can move up, down, right, and left as shown by arrows in FIG. 5. After the device 35 is disposed below the wire elements a to be gathered, the device 35 is moved up to clamp the wire elements a between the pins 37 and then moyed right and left to gather the wire elements a.

Figure 9A:
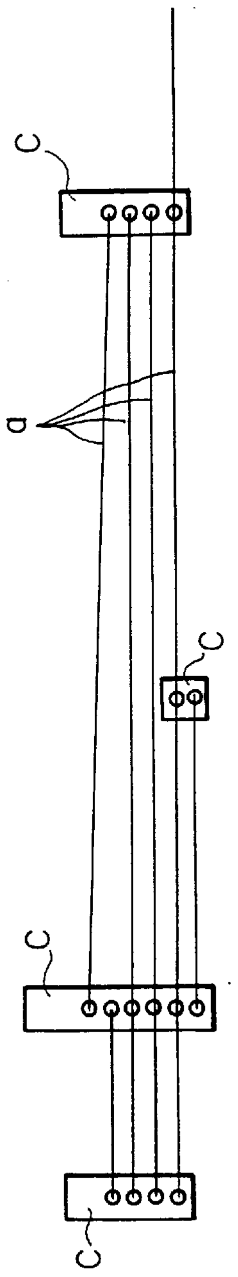
FIGS. 9A to 9C are explanatory views of processes of still another embodiment of the producing method in accordance with the present invention.
Figure 9B:
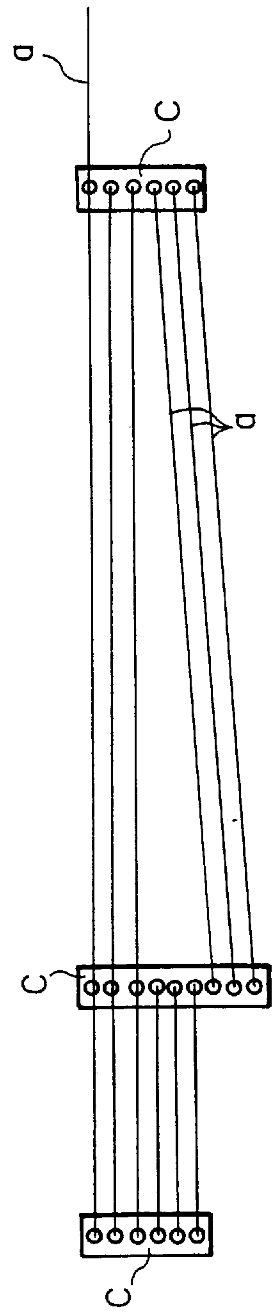
Figure 9C:
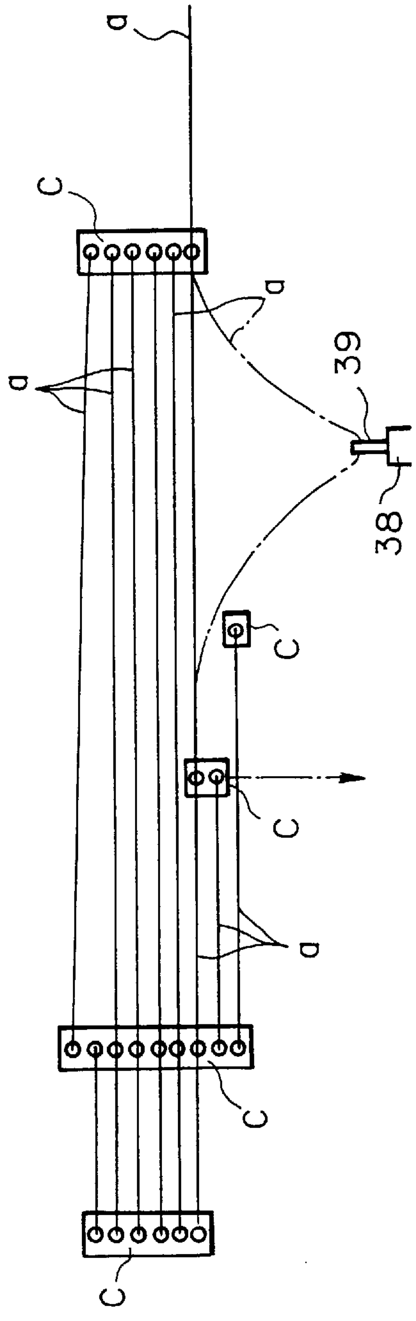
Figure 10:
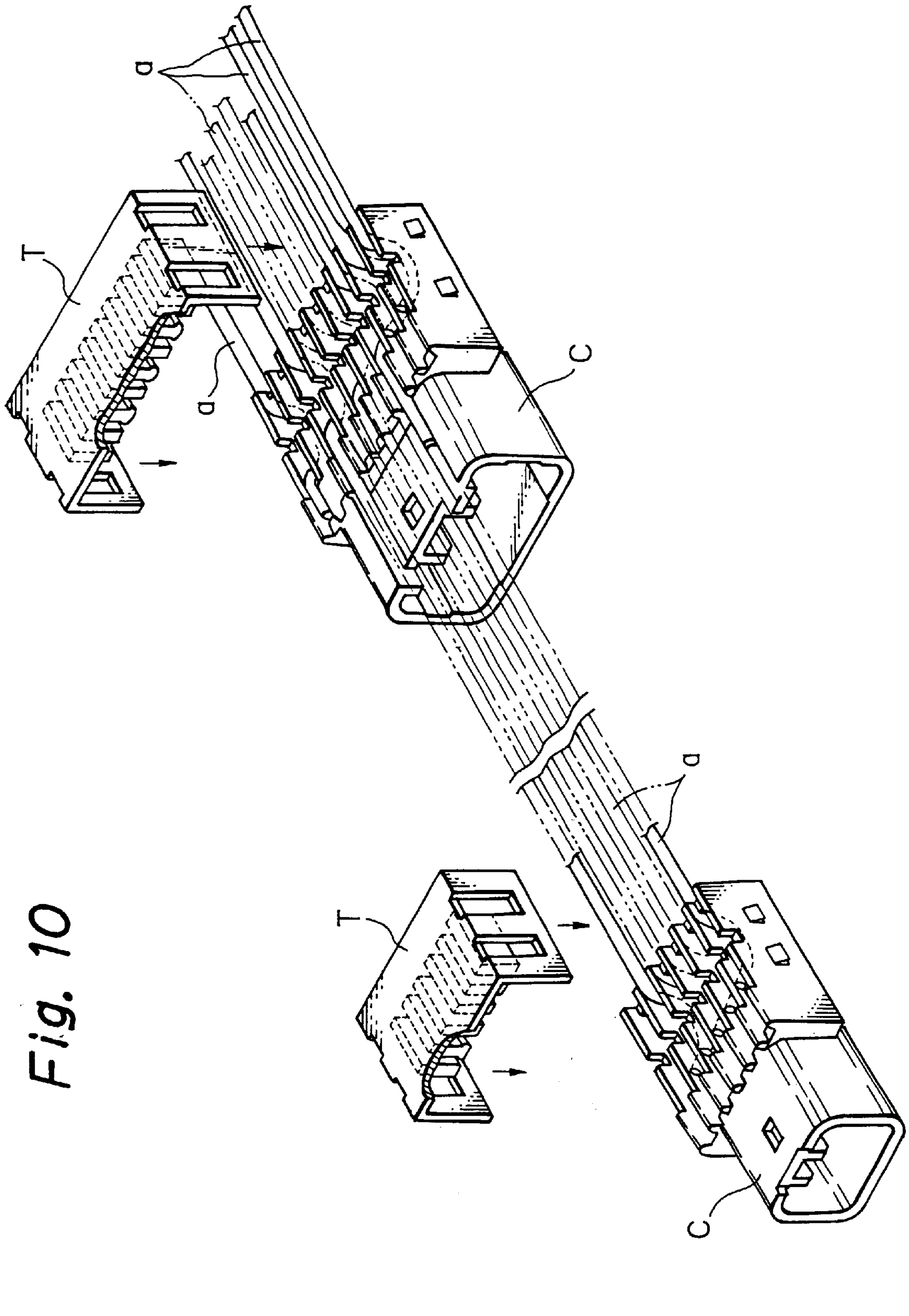
FIG. 10 is an exploded perspective view of an embodiment of a wire harness in accordance with the present invention.
Figure 11:
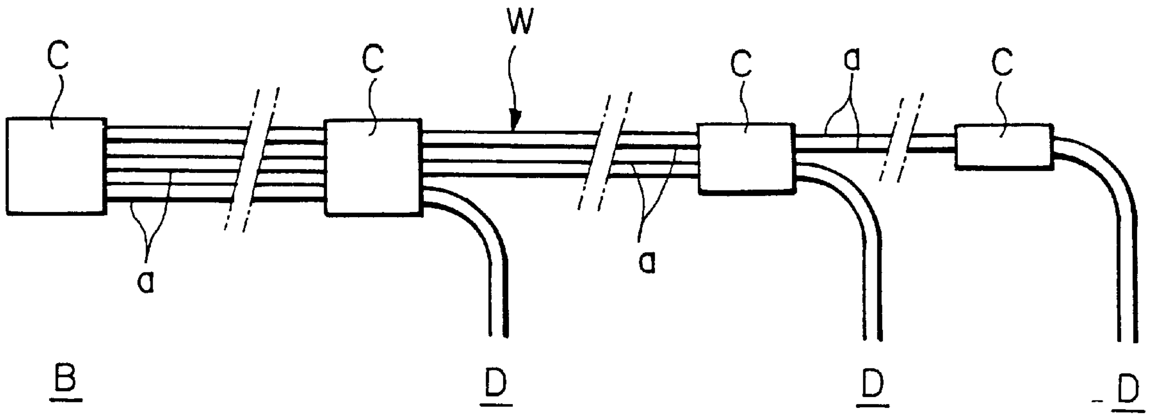
Fig. 11 PRIOR ART
FIG. 11 is an explanatory view of a conventional wire harness.
Figure 12:
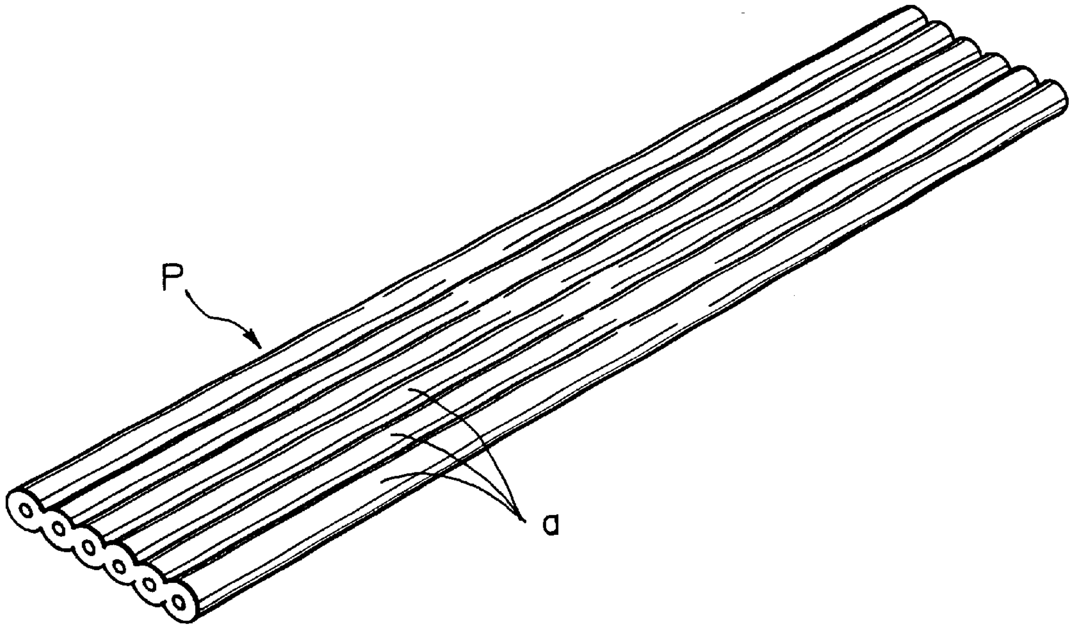
Fig. 12 PRIOR ART
FIG. 12 is a perspective view of a conventional flat electric wire.

The wire drawing device 38 has a champing pawl 38*a* which can move up, down, right, and left to champ any wire element a. When the champing pawl 38*a* grasps any wire element a and moves down, the wire element a is drawn from the gripper 12 (groove guide 11) and becomes longer than the other wire elements a (see FIG. 9C). At this time, the gripper 12 (air cylinder 13) releases the wire element a or moves up and the wire feeder 15 (feeding roller 16*a*) is actuated to feed the wire element a.

The covers T are arranged on the cover supply table 39 in order in accordance with the connectors C to be connected. The cover T is manually attached to the connector C. This work may be automatically carried out by an automatic machine.

The measuring and drawing station 40 includes a measuring and drawing device 41 which has a screw shaft 42 and a chuck 43 for a wire element a engaged with the screw shaft 42. The chuck 43 is adapted to grasp the wire elements a. When the screw shaft 42 is turned by a given number of revolution by a motor (not shown), the chuck 43 is displaced by a given distance on the screw shaft to draw the wire elements a by a given length from the gripper (groove guide 11). That is, measuring of the wire elements a is carried out by adjusting a drawing of the wire elements a and then the measured wire elements a are cut off by a given length (by the cutters 21 and 22). During drawing, the gripper 12 releases the wire elements a to be drawn (the air cylinder 13 moves up the gripper 12) and the feeder 15 (feeding roller 16*a*) is actuated to feed the wire elements a.

FIGS. 6A through 6G illustrate producing processes carried out by the embodiment of the producing apparatus described above. The insulator-sheathed electric wire elements a juxtaposed on a plane are led through the groove guide 11 to the cutting station 20. The ends of the wire elements a are cut off by the cutters 21 and 22 to align the ends of the elements. Then, the gripper 12 champs the ends of the wire elements. FIG. 6A illustrates this state. As shown in FIG. 6B, the groove guide 11 moves forward to draw the ends of the wire elements a to the chuck 43 of the measuring and drawing device 41 and then the chuck 43 grasps the ends of the wire elements a. Thereafter as shown FIG. 6C, the chuck 43 carries the wire elements a are pressed into the connector C in the insulation displacement manner. At this time, the groove guide 11 comes back to the original position with the gripper 12 releasing the wire elements a. The wire elements a are under a condition to be easily drawn.

Next, as shown in FIG. 6D, the chuck 43 moves forward to draw the wire elements a. When the wire elements a are drawn by a desired length, they are pressed into another connector C in the insulation displacement manner. The wire elements a are further drawn by a length necessary for a product. As shown in FIG. 6E, the wire elements a are pressed into still another connector C and are cut off from the mother wire elements a. At this time, the wire elements a may not-be pressed into the connector C before they are cut off, as shown in FIG. 6F. After cutting as shown in FIG. 6G, the chuck 43 moves forward a little so that the wire harness W including the wire elements a juxtaposed and secured together to each other by the connectors C is separated away from the mother wire elements a and then is paid off on a tray or the like. The chuck 43 returns to the original position (FIG. 6A). The gripper 12 champs the wire elements a and the groove guide 11 moves forward to the chuck 43. The chuck 43 grasps again the wire elements a. The wire harness W shown in FIG. 1 is successively produced by repeating the above processes.

Figure 13A:
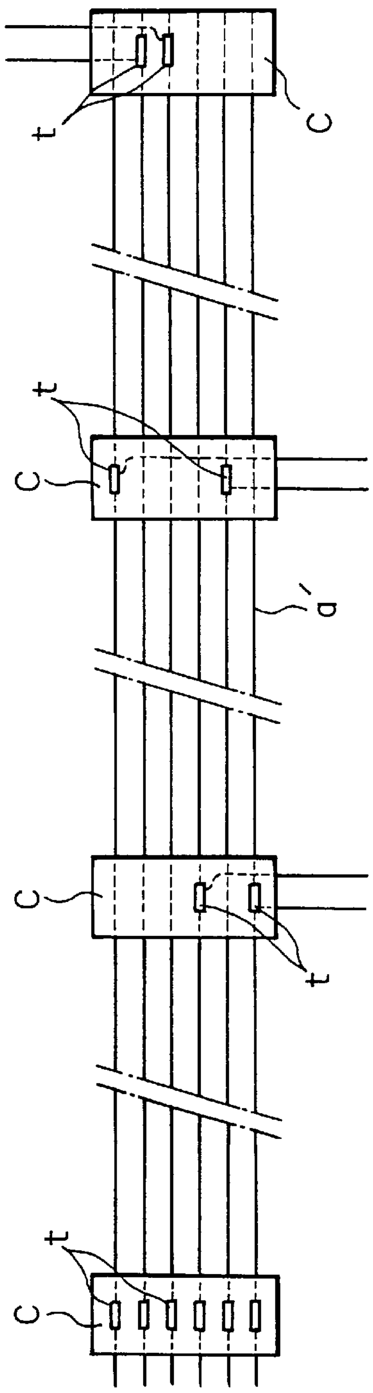
Fig. 13A PRIOR ART
FIGS. 13A and 13B are explanatory views of a conventional method for branching the wire harness.

In the above embodiment, the wire harness W has the juxtaposed wire elements a with the same length. However, in the case of producing the wire harness W shown in FIGS. 13A and 13B, the wire element a' becomes useless. FIGS. 7A through 7G illustrates a producing method which can eliminates the useless wire element a'. The processes shown in FIGS. 7A to 7C are the same as those shown in FIGS. 6A to 6C, until the chuck 43 clamps the wire elements a. As shown in FIG. 7D, the wire elements a are drawn and measured by a length necessary for working requirements and are pressed into the connector C and cut off. The cut-off wire elements a are damped by the gripper 12. Similarly, as shown in FIGS. 7E and 7F, the respective wire elements a are cut off by the respective desired length and are pressed into the connector C. As shown in FIG. 7, the wire harness W having the wire elements with different lengths in order is produced.

Figure 13B:
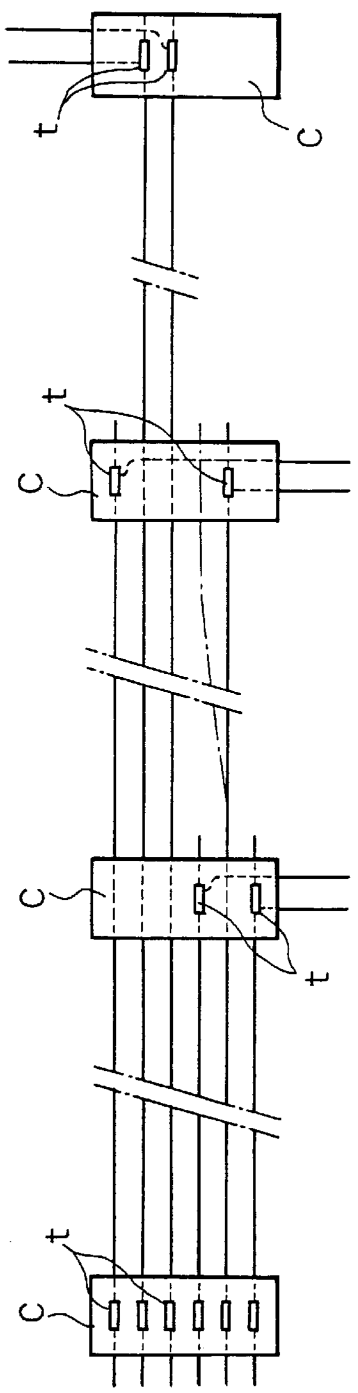
Fig. 13B PRIOR ART

However, in the stepped wire harnesses W there is a wire harness with irregular lengths as shown in FIG. 13B. In this case, the terminals t do not receive the adjacent wire elements a and thus the wire elements a are not cut off from one side to the other side in order. In this case, as shown in FIGS. 8A through 8H, the wire gathering device 35 gathers the wire elements to be pressed into the connector to bring the distances between the wire elements a into equal pitches. These equal pitches can make the connector C compact. That is, since the insulation displacement terminals t are usually arranged in equal pitches in the connector C, if the wire elements a are gathered, the connector may have the terminals with the gathered pitch. Otherwise, the connector C will have more terminals with non-gathered pitch.

Such gathering of the wire elements a (for example, six or nine elements) can obtain wire harnesses W as shown in FIGS. 9A through 9C and FIG. 10. As shown by a one-dot chain line in FIG. 9C, a desired wire element a is drawn by the wire drawing device 38 so that the desired wire element a between the connectors C, C is longer than the other wire elements a therebetween. Consequently, the desired wire which projects from the paths of the other wire elements can be easily connected to an electric appliance.

In this embodiment, the chuck 43 grasps the wire elements a on this side of the insulation displacement press device 31. However, the chuck 43, may clamp the wire elements a after the wire elements a are passed through the press device 31 by the groove guide 11. Also, in the processes shown in FIGS. 6A to 6G the blades 21*a* of the cutter may be a single one. In addition, the grippers 12 may be a single one and the feeder 15 may be omitted.

Further, in this,embodiment, any number of the juxtaposed wire elements a can be utilized and the pushers 13*a* (air cylinders 13) and feeding roller is 16*a* (air cylinders 16) may be provided in accordance with the number of the wire elements a.

The present invention can provide an inexpensive wire harness.

It is possible to make it easy to connect the terminal to the wire element in an insulation displacement manner, to make the connector compact, and to lower a total cost.

What is claimed is:

1. An apparatus for producing a wire harness for an automotive vehicle, comprising the following components arranged linearly in the following precise order:

a gripper (12) having a plurality of pushers (13*a*) independently-operable by air cylinders (13) for selectively clamping ends of one or more insulator-sheathed electric wire elements (a) juxtaposed on a plane, one cylinder per wire element;

a feeder (15) on a downstream side of said gripper (12), said feeder having a plurality of rollers (16*a*) independently-operable by air cylinders (16), one cylinder per wire element (a), for selectively feeding one or more of said wire elements (a) in a downstream direction along a linear path;

a cutter (21) on a downstream side, of said feeder (15), said cutter having a plurality of independently-operable blades (21*a*), one blade per wire element (a), for selectively cutting off one or more of said wire elements at varying lengths;

a movable wire gathering device (35) on a downstream side of said cutter (21), for gathering said wire elements (a) in a width direction in accordance with a pitch between terminals juxtaposed in a connector (C);

a press (30) on a downstream side of said wire gathering device (35), said press being adapted to secure said wire elements (a) to said connector (C) in an insulation displacement manner;

a wire-drawing device (38) on a downstream side of said press (30), said wire-drawing device being adapted to clamp a group of said wire elements (a) and to draw said group of wire elements by a desired length from said gripper (12); and a measuring and drawing device (40) on a downstream side of said wire-drawing device (38), said measuring and drawing device being adapted to clamp ends of said wire elements (a) and draw said wire elements by a desired length by a chuck (43) provided in said measuring and drawing device.

* * * * *